June 29, 1965  J. V. McKINNON ETAL  3,191,621
HYDRAULICALLY-OPERATED VALVES
Filed Feb. 21, 1963  4 Sheets-Sheet 1

INVENTORS
JOHN VICTOR MC KINNON
JOHN MONSON
BY Kenwood Ross
ATTORNEY.

INVENTOR:
JOHN VICTOR MC KINNON
JOHN MONSON
BY *Kenwood Ross*
ATTORNEY.

June 29, 1965  J. V. McKINNON ETAL  3,191,621
HYDRAULICALLY-OPERATED VALVES
Filed Feb. 21, 1963  4 Sheets-Sheet 3

INVENTOR:
JOHN VICTOR MC KINNON
JOHN MONSON
BY Kenwood Ross
ATTORNEY.

June 29, 1965   J. V. McKINNON ETAL   3,191,621
HYDRAULICALLY-OPERATED VALVES
Filed Feb. 21, 1963   4 Sheets-Sheet 4

INVENTORS.
JOHN VICTOR MCKINNON
JOHN MONSON
BY
*Kenwood Ross*
ATTORNEY.

United States Patent Office 3,191,621
Patented June 29, 1965

3,191,621
HYDRAULICALLY-OPERATED VALVES
John Victor McKinnon, North Shields, and John Monson, Wallsend-on-Tyne, England, assignors to Donkin and Company Limited, Newcastle-upon-Tyne, England
Filed Feb. 21, 1963, Ser. No. 260,231
1 Claim. (Cl. 137—553)

This invention concerns hydraulically-operated valves for pipelines, for example, large sluice valves such as are used in large numbers on oil tankers, of the type having a hydraulic actuating cylinder enclosing a double-acting piston, displacement of which is effected by supplying hydraulic fluid under pressure to one side or the other of the piston to open or close the valve.

The primary advantage with a hydraulically-operated valve resides in the fact that it can be controlled from a remote point, so that it is possible, for example, for one operative to control a large number of such valves from a common control station. It is difficult, however, to provide reliable means for indicating the condition of such a valve (i.e. whether it is open or shut). For example, where such a valve has its hydraulic cylinder connected to a sight glass or like indicator which receives that hydraulic fluid which is discharged from the cylinder upon actuation thereof (i.e. "the return fluid"), the indicator can become "out-of-step" with the valve so that the indication thereof is not a true indication of the precise condition of the valve.

An object of the present invention is to provide an arrangement which will reliably indicate the fully open and fully closed conditions of a hydraulically-operated valve in such a manner that it is impossible for the indicator to become out-of-step.

Figure 1:
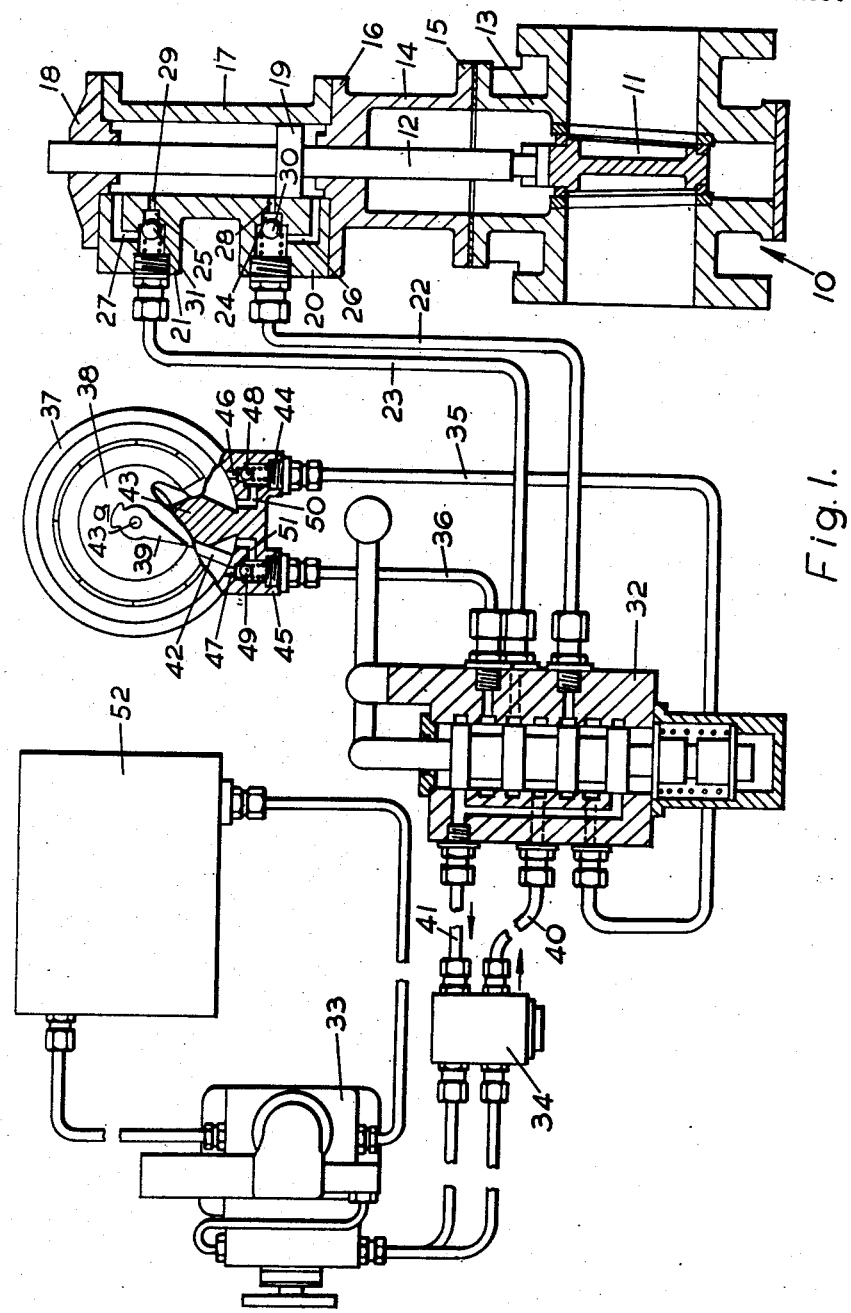
FIGURE 1 is a part-sectional diagrammatic illustration of the hydraulically-operated valve and its cooperant devices including the valve position indicator and the pressure fluid controller.

The sluice valve is a gate valve 10 operating in known manner and embodying a linearly displaceable gate 11 carried by an actuating rod 12 which projects out of a valve body 13. Surrounding the projecting part of actuating rod 12 is a sleeve 14 which is flanged at both ends, one flange 15 serving for securing sleeve 14 to valve body 13, while second flange 16 constitutes a mounting for a hydraulic actuating cylinder 17 by which the valve can be actuated.

Actuating rod 12 extends through second flange 16, and is sealed relative thereto, while being capable of axial movement.

The hydraulic actuating cylinder 17 is a tubular cylinder bolted by one end to second flange 16, and actuating rod 12 of the valve extends through such cylinder 17 to constitute a piston rod thereof, the cylinder being closed, at its end remote from sleeve 14, by an end cap 18 through which actuating rod 12 projects and is axially slidable, being sealed relative thereto. The rod 12 has mounted thereon, within actuating cylinder 17, a double acting piston 19.

Adjacent each end, bosses 20, 21 are provided on actuating cylinder and these provide for the connection, to the cylinder, of two feed ducts 22, 23 respectively. Each boss 20, 21 is bored at 24, 25 respectively to connect with two corresponding passages to the interior of the cylinder, these being primary flow passages 26, 27 respectively which connect with the cylinder interior adjacent the respective end thereof, and supplementary or branch passages 28, 29 respectively which connect with the cylinder interior at a distance, from corresponding primary flow passage 26 or 27, slightly greater than the thickness of double-acting piston 19. Each supplementary passage 28, 29 is provided with a respective non-return valve 30, 31 acting to prevent passage of pressure fluid from respective boss bore 24, 25 through the respective supplementary passage 28, 29 inwardly to cylinder 17, but permitting flow of the fluid in the opposite direction, outwardly from the cylinder to respective feed duct 22, 23.

The two feed ducts 22 and 23 connect with a manually-controllable fluid controller or distributor 32 which is additionally connected also with a fluid pump 33 through a relief valve 34 and is connected, by two indicator ducts 35, 36, to a valve position indicator 37. The indicator casing is of cylindrical form with a spindle 43a on the axis of the cylinder carrying an external indicator pointer 39. Mounted on the spindle, inside of the casing, is a flap 42 which rotates with the spindle and indicator pointer. A fixed radial dividing wall 43 in the casing, suitably sealed on spindle 43a, together with flap 42, divides the casing into two compartments. Thus, flap 42 is limited in its travel to its points of contact with dividing wall 43. These end positions of flap 42 correspond with "closed" and "open" positions of the indicator. Indicator ducts 35 and 36 are connected to the indicator casing by bosses 44 and 45 respectively. Passages 50 and 51 connect ducts 35 and 36 respectively to the interior of the casing, the openings into the casing being immediately adjacent dividing wall 43, the arrangement of dividing wall 43 and flap 42 in relation to the position of these openings being such that these openings are between the dividing wall and rotating flap, so that indicator ducts 35 and 36 are permanently connected through these passages to opposite sides of the indicator. Further passages 46 and 47 also connect indicator ducts 35 and 36 respectively to the interior of the casing, each of these passages however being provided with spring loaded non-return valves 48 and 49 respectively which prevent passage of fluid into the casing but allow fluid to come out from the casing. These passages 46 and 47 have openings into the casing, so arranged that, when flap 42 is in an intermediate position, they open into the same compartments respectively as passages 50 and 51. When however flap 42 moves over either to the "closed" or to the "open" position, immediately prior to reaching the final position, the flap passes over the ports, so that the flap separates port 51 and passage 47 when the flap is in the "closed" position and separates the port 50 and passage 46 when the flap is in the "open" position.

In FIG. 1, the partially sectioned view of the indicator shows the flap in the "closed" position.

Figure 2:
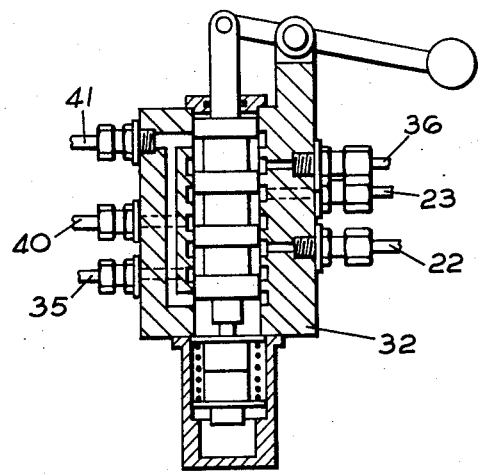
FIGURE 2 is a fragmentary view of the controller or distributor of the valve of FIGURE 1, in position for closing the valve.
Figure 3:
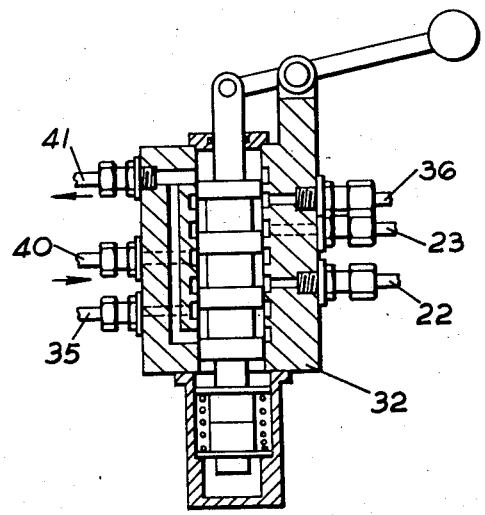
FIGURE 3 is a view, similar to FIGURE 2, but showing the controller in position for opening the valve.

The controller or distributor is actuatable from the rest position, shown in FIG. 1, to either a "close valve" position, as shown in FIG. 2, wherein: (a) feed duct 23 is put into communication with a pump outlet pipe 40 from pump 33, (b) feed duct 22 is connected with indicator duct 35, and (c) the other indicator duct 36 is connected with a pump inlet pipe 41 of pump 33; or an "open valve" position, as shown in FIG. 3, wherein: (a) feed duct 22 is put into communication with pump outlet pipe 40, (b) feed duct 23 is connected with indicator duct 36, and (c) indicator duct 35 is connected with the pump inlet pipe 41 of pump 33.

An appropriate make-up tank 52 is also connected to pump 33 to ensure that the hydraulic circuit is always properly full of liquid.

Assuming valve 10 to be closed, as shown, actuation thereof is effected by manual operation of controller 32 to the "open valve" position of FIGURE 3. Pressure fluid from pump 33 is, therefore, allowed to flow to hydraulic actuating cylinder 17 through feed duct 22 and corresponding primary flow passage 26 to the relevant end of cylinder 17, thereby displacing piston 19 towards the other end of cylinder 17 to move rod 12 and with it gate 11 to open the valve.

As piston 19 moves along cylinder 17, it displaces return fluid already in the cylinder into feed duct 23, so that such return fluid passes through indicator duct 36 through passage 51 to one side of flap 42 thereby displacing the flap and with it pointer 39 from the "closed" towards the "open" position. However, the capacity of indicator 37 is made greater than that of cylinder 17 so that pointer 39 cannot move to the fully "open" position solely by the hydraulic fluid which has been displaced by the movement of piston 19 in cylinder 17. The return fluid from indicator 37, which is displaced by movement of the flap, passes through passage 50 to indicator duct 35 then through controller 32 back to pump 33.

When piston 19 reaches the end of its stroke, corresponding to the fully open position of valve 10, piston 19 passes the opening of supplementary passage 29 connecting with feed duct 23. Because of this, the fluid under pressure, which is flowing from pump 33 through feed duct 22 into cylinder 17, is now permitted to flow through feed duct 23 and indicator duct 36 to indicator 37 through passage 51, thereby providing a substantial additional volume of oil on the appropriate side of the flap to move it and pointer 39 right round until it contacts dividing wall 43 on other side indicating "open" position of the valve 10. In reaching the "open" position, the flap immediately prior to reaching this position uncovers passage 46 and fluid then lifts non-return valve 48 and passes through duct 35, through controller 32 and then back along duct 41 to pump 33.

Upon subsequent manual actuation of controller 32 to the "close valve" position of FIGURE 2, corresponding actions occur, but the flow of the fluid is in the opposite direction in each of the ducts, and gate 11 moves from the open position towards the closed position.

It will be appreciated therefore, that the arrangement of the invention provides, in a very simple manner, a hydraulically-operated valve in combination with a valve position indicator, wherein full indicator actuation is delayed, upon each actuation of the valve, until such valve actuation is completed, whereupon the indicator is positively displaced to indicate the position just assumed by the valve. The indicator cannot, of course, get out-of-step with the valve.

Figure 5:
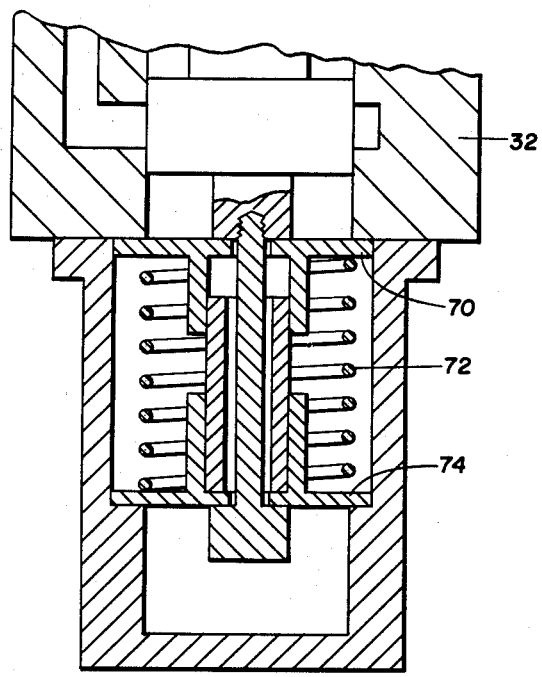
FIGURE 5 is an enlarged view, partially in section, showing the spring means of the fluid controller or distributor.

In FIG. 5, the spring means in the controller is shown. When the valve member is moved down, washer 70 also moves down and comprises a spring 72. When the valve member is released, the spring returns the valve member to its rest position. When the valve member is moved up, washer 74 also moves up and compresses the spring. When the valve member is released, the spring returns the valve member to its rest position.

Sometimes it is desired to have two controlling positions for a given valve. In this case there would of course be two controllers 32, one at each station, and two indicators 37, and each controller would be spring loaded to the rest position, so that in the event of one controller being used the other controller would definitely be in the rest position.

Figure 4:
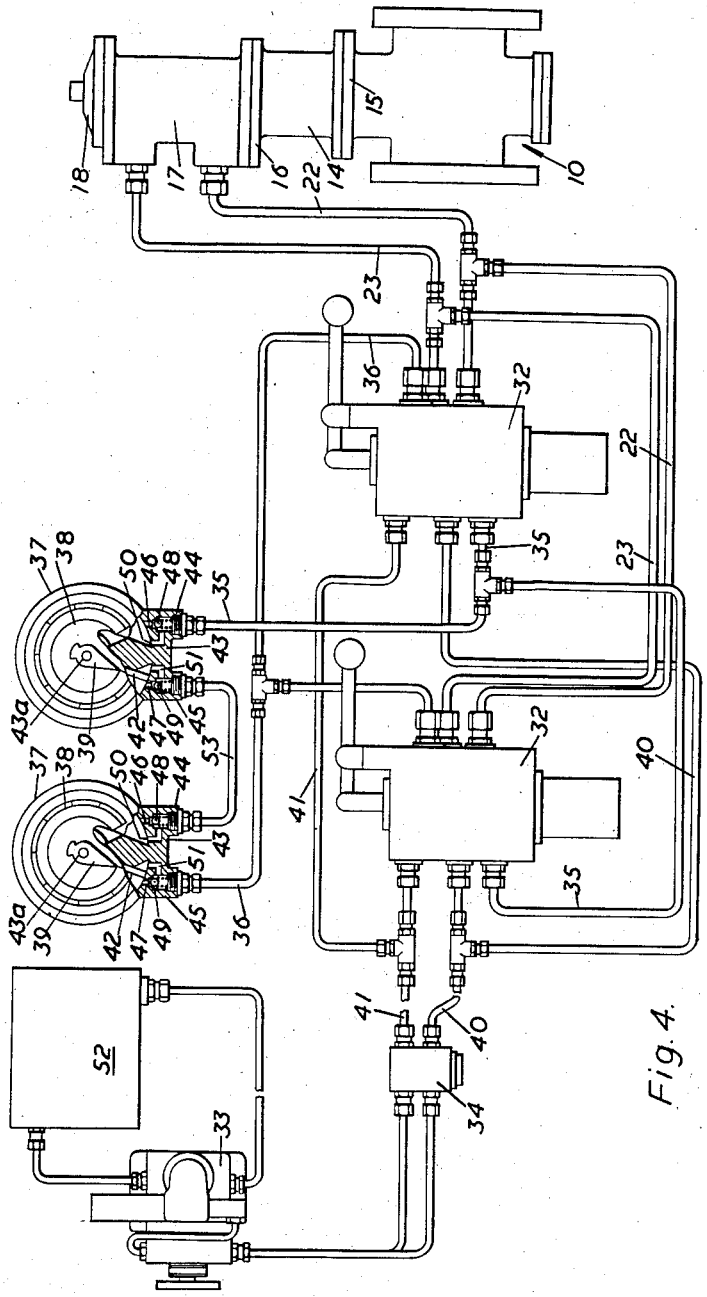
FIGURE 4 is a view, similar to FIGURE 1, but showing an arrangement wherein a single valve can be operated from two separate locations.

Such an arrangement is shown in FIG. 4. The ducts 36 from the two controllers 32 are joined together and a single pipe led from them to the boss 45 on the first of the two indicators 37. The ducts 35 from the controllers 32 are also joined together and a single pipe taken from them to the boss 45 on the first of the two indicators 37.

The ducts 35 from the controllers 32 are also joined together and a single pipe taken from them to the boss 44 on the second indicator 37. A connecting pipe 53 joins the boss 44 on the first indicator 37 to the boss 45 on the second indicator 37. FIG. 4 shows the two indicators 37 coupled up in this manner, and with the vane 42 and pointer 39 in the closed position on each indicator. Since the controllers 32 are spring loaded to their rest positions, if either of the controllers is now moved to open the valve, oil passes along the duct 36 to the first indicator 37 and moves the vane 42 thereof from the closed position. As this vane 42 moves, it displaces oil from the other side of the vane through the duct 50 along the pipe 53 to the duct 51 on the second indicator 37, causing the vane of the second indicator 37 to move round at the same time as the vane on the first indicator. When the valve has finally reached the open position the extra oil from the discharge side of the pump 33 is now fed into the first indicator to move the vane round to its final position; the vane on the first indicator reaches the fixed vane 43, and stops movement. The duct 46 is now open to the oil which opens the non-return valve 48; the oil then passes down through the pipe 53 into the second indicator where it pushes the vane of such second indicator around to its final position. When such final position is reached the vane allows the oil to pass down the duct 46 on the second indicator, past the non-return valve 48 on down through the duct 35 back to the return side of the pump via the controller.

With the arrangement, the volume of oil passing to the indicators stays the same as when there is one indicator, and the pointers of both indicators will move a similar amount to what would have been the case had there been one indicator; also the final positions of the indicators will only be reached after the valve has reached its final position, as before.

We claim:

In combination with a valve in a conduit embodying a gate linearly displaceable relative to a valve body and supporting an actuating rod projecting outwardly of the valve body.

a two station pressure fluid operated means for reciprocating the gate of the valve from either of the two stations including a closed hydraulic circuit and constituted by:

a pump subassembly for circulating hydraulic fluid under pressure in said circuit, a motor subassembly for actuating the gate of the valve and including a cylinder fixed to the valve body and defining pressure and discharge chambers at opposite sides of a double-acting piston mounted upon the projecting portion of the actuating rod for slideable displacement within the cylinder between valve-closed and valve-opened positions, reciprocation of the piston being adapted to effect reciprocation of the gate, a pair of indicator subassemblies in said circuit for indicating the position of the valve and being serially related to each other, each said indicator subassembly being positioned at one of the stations and including a cylindrical casing divided into a pair of variable compartments defined by a fixed radial wall and a cooperant flap swingable rotatively within the casing between the limits of its contact with the opposite faces of the radial wall responsively to the flow of fluid into and from the variable compartments and a valve position indicating means rotatable with and according to the rotation of the flap, a pair of pressure fluid controller subassemblies in said circuit operable for directionally controlling fluid flow to and from said indicator subassemblies and motor and pump subassemblies and being serially related to each other, each said controller subassembly being positioned at one of the stations and including a slide reciprocable within a casing and being manually operable selectively between effecting valve opening and effecting valve closing positions, said controller subassemblies having fluid connection with said motor subassembly by a pair of fluid carrying feed ducts each communicating with one of the cylinder chambers through a primary flow passage and a valved supplementary flow passage spaced therefrom, each feed duct serving alternatively for supplying fluid from said controller subassemblies to said motor subassembly and for conducting fluid from said motor subassembly to said controller subassemblies, said controller subassemblies having fluid connection with said indicator subassemblies by a pair of fluid carrying indicator ducts each communicating with one of the variable compartments of each of said indicator subassemblies through a primary flow passage and a valved supplementary flow passage spaced therefrom, each indicator duct serving alternately for supplying fluid from said controller subassemblies to said indicator subassemblies and for conducting fluid from said indicator subassemblies to said controller subassemblies, said controller subassemblies having fluid connection with said pump assembly by a pump outlet duct for supplying fluid from said pump assembly and a pump inlet duct for returning fluid to said pump subassembly, each said controller subassembly being operable by the positioning of the slide relative to the casing in effecting valve closing position for directionally controlling fluid passage from said pump subassembly through the pump outlet duct and controller subassemblies and one of the feed ducts into one of the chambers of each of said motor subassemblies and returnably from the other of the chambers of each of said motor subassemblies through the other of the feed ducts and controller subassemblies and one of the indicator ducts into one of the compartments of said indicator subassemblies and returnably from the other of the compartments through the other of the indicator ducts and said controller subassemblies and pump inlet duct to said pump subassembly and being operable in effecting valve opening position for directionally controlling fluid passage from said pump subassembly through the pump outlet duct and controller subassemblies and the said other of the feed ducts into the said other of the chambers of said motor subassembly and returnably from the said one of the chambers through the said one of the feed ducts and controller subassemblies and the said other of the indicator ducts into the said other of the compartments of said indicator subassemblies and returnably from the said one of the compartments through the said one of the indicator ducts and said controller subassemblies and pump inlet duct to said pump subassembly, the fluid capacity of said indicator assemblies being greater than the fluid capacity of said motor subassembly, the exhausting of one of the chambers of said motor subassembly allowing reciprocation of the piston to the extreme limit of its travel and past the valved supplementary flow passage of the said one chamber for the escape of a volume of fluid therepast from the other of the chambers and through the return system of feed duct and said controller subassemblies and indicator duct to said indicator subassemblies for effecting an additional and subsequent increment of movement of the flap and corresponding movement of the respective indicating means.

References Cited by the Examiner

UNITED STATES PATENTS

| 2,112,466 | 3/38 | Maloon | 60—52 |
| 2,665,122 | 1/54 | Rowland. | |
| 2,984,985 | 5/61 | MacMillin | 60—53 X |
| 3,009,474 | 11/61 | Crichton | 137—344 |

FOREIGN PATENTS 871,173    6/61    Great Britain.

M. CARY NELSON, *Primary Examiner.*